United States Patent [19]

Hagerty et al.

[11] Patent Number: 4,634,752

[45] Date of Patent: Jan. 6, 1987

[54] PROCESS FOR PREPARING ALPHA-OLEFIN POLYMERS

[75] Inventors: Robert O. Hagerty, Edison; Irena B. Petsche, Cranbury; Kenneth G. Schurzky, Bridgewater, all of N.J.

[73] Assignee: Mobil Oil Corporation, New York, N.Y.

[21] Appl. No.: 771,740

[22] Filed: Sep. 3, 1985

Related U.S. Application Data

[62] Division of Ser. No. 657,642, Oct. 4, 1984, Pat. No. 4,562,169.

[51] Int. Cl.$^4$ ............................ C08F 4/02; C08F 4/64
[52] U.S. Cl. .................................... 526/129; 526/148; 526/151; 526/156; 526/159; 526/348.5; 502/120
[58] Field of Search ............... 526/129, 148, 151, 156, 526/159

[56] References Cited

U.S. PATENT DOCUMENTS

| | | | |
|---|---|---|---|
| 3,787,384 | 1/1974 | Stevens et al. | 526/129 X |
| 4,148,754 | 4/1979 | Strobel et al. | 526/156 X |
| 4,173,547 | 11/1979 | Graff | 526/151 X |
| 4,247,669 | 1/1981 | Reginato et al. | 526/156 |
| 4,263,171 | 4/1981 | Shida et al. | 526/156 X |
| 4,376,061 | 3/1983 | Swift et al. | 526/129 X |
| 4,481,301 | 11/1984 | Nowlin et al. | 526/129 X |

Primary Examiner—Patrick P. Garvin
Attorney, Agent, or Firm—Alexander J. McKillop; Michael G. Gilman; Stanislaus Aksman

[57] ABSTRACT

Alpha-olefin polymerization catalysts are prepared by heating a solid porous carrier having reactive OH groups in the atmosphere of an oxygen-containing gas. The resulting catalysts exhibit higher productivity and produce ethylene polymers or ethylene/$C_3$–$C_{10}$ copolymers having higher bulk density than similar catalysts prepared with the carriers heated in an atmosphere of nitrogen.

28 Claims, 1 Drawing Figure

PROCESS FOR PREPARING ALPHA-OLEFIN POLYMERS

This is a divisional of copending application Ser. No. 657,642, filed on Oct. 4, 1984 and now U.S. Pat. No. 4,562,169.

BACKGROUND OF THE INVENTION

1. Field of the Invention

The invention relates to a method for polymerizing alpha-olefins, a catalyst for such a polymerization method and a method for producing such a catalyst. More particularly, the invention relates to a catalyst and to a method of using thereof in alpha-olefin polymerization reactions which produces linear low density polyethylene (LLDPE) and high density polyethylene (HDPE) having high bulk density. The invention also relates to a catalyst composition exhibiting very high productivity characteristics, as compared to similar prior art catalysts.

2. Description of the Prior Art

Linear low density polyethylene polymers possess properties which distinguish them from other polyethylene polymers, such as homopolymers of polyethylene. Certain of these properties are described in Anderson et al., U.S. Pat. No. 4,076,698.

Karol et al., U.S. Pat. No. 4,302,566, describes a process for producing certain linear low density polyethylene polymers in a gas phase, fluid bed reactor.

Graff, U.S. Pat. No. 4,173,547, Stevens et al., U.S. Pat. No. 3,787,384, Strobel et al., U.S. Pat. No. 4,148,754, and Ziegler, deceased, et al., U.S. Pat. No. 4,063,009, each describe various polymerization processes suitable for producing forms of polyethylene other than linear low density polyethylene, per se.

Graff, U.S. Pat. No. 4,173,547, describes a supported catalyst obtained by treating a support with both an organoaluminum compound and an organomagnesium compound followed by contacting this treated support with a tetravalent titanium compound.

Stevens et al., U.S. Pat. No. 3,787,384, and Strobel et al., U.S. Pat. No. 4,148,754, describe catalysts prepared by first reacting a support (e.g., silica containing reactive hydroxyl groups) with an organomagnesium compound (e.g., a Grignard reagent) and then combining this reacted support with a tetravalent titanium compound. According to the teachings of both of these patents, no unreacted organomagnesium compound appears to be present when the reacted support is contacted with the tetravalent titanium compound.

Ziegler, deceased, et al., U.S. Pat. No. 4,063,009, describe a catalyst which is the reaction product of an organomagnesium compound (e.g., an alkylmagnesium halide) with a tetravalent titanium compound. The reaction of the organomagnesium compound with the tetravalent titanium compound takes place in the absence of a support material.

A vanadium-containing catalyst, used in conjunction with triisobutylaluminum as a co-catalyst, is disclosed by W. L. Carrick et al in *Journal of American Chemical Society*, Volume 82, page 1502 (1960) and Volume 83, page 2654 (1961).

Nowlin et al., U.S. patent application Ser. No. 444,152, filed Nov. 24, 1982, now U.S. Pat. No. 4,481,301 teach an alpha-olefin polymerization catalyst prepared by heating a solid, porous carrier in a nitrogen atmosphere at a temperature of about 100° C. to about 800° C., contacting the carrier containing reactive hydroxyl groups (OH) with a greater than a stoichiometric amount of an organomagnesium composition, and reacting the product of that step with a tetravalent titanium compound, also used in the amount greater than the stoichiometric amount thereof with respect to the hydroxyl groups on the carrier, to produce a catalyst precursor. The catalyst precursor is then combined with an activator, also known as a co-catalyst, to produce an active catalyst composition.

It is a primary object of the present invention to provide an active catalyst composition which is capable of polymerizing alpha-olefins either in a continuous, gas phase fluid bed process or in a batch reactor process to produce polymers having increased bulk density, as compared to polymers prepared with the catalysts of prior art.

It is an additional object of the invention to provide an alpha-olefin polymerization catalyst composition having higher productivity than the catalysts of prior art.

Additional objects of the invention will become apparent to those skilled in the art from the following description of the invention.

SUMMARY OF THE INVENTION

The invention is directed to an improvement in a catalyst composition and to the use thereof in alpha-olefin polymerization reactions. The catalyst composition is prepared in a process comprising the steps of:

(i) heating a solid, porous carrier;

(ii) contacting a solid, porous carrier having reactive OH groups with a first liquid containing at least one organomagnesium composition having the empirical formula $$R_n MgR'_{(2-n)} \qquad (I)$$

where R and R' are the same or different and they are $C_1$–$C_{12}$ hydrocarbyl groups, provided that R' may also be halogen, and n is 0, 1 or 2, the number of moles of said organomagnesium composition being in excess of the number of moles of the OH groups on the carrier;

(iii) removing the first liquid from step (ii) to obtain a magnesium-containing carrier in the form of a dry, free-flowing powder; and (iv) contacting the powder of step (iii) with a solution comprising a second liquid and at least one transition metal compound which is soluble in the second liquid.

The magnesium-containing carrier is substantially insoluble in the second liquid. As a result, a compound of the transition metal which is insoluble in the second liquid becomes incorporated onto the carrier, thereby forming a catalyst precursor. The precursor is then combined with a sufficient amount of a catalyst activator to obtain a catalytically active catalyst composition.

The improvement of this invention comprises heating the solid, porous carrier in step (i) at a temperature of about 100° C. to about 1000° C. in an atmosphere of an oxygen-containing gas, rather than in nitrogen, commonly thought equivalent in prior art to the oxygen-containing gas. The resulting catalyst composition exhibits improved productivity characteristics, when it is used in a process for polymerizing alpha-olefins, described below, as compared to a similar catalyst composition wherein the solid, porous carrier is heated in a nitrogen atmosphere.

The present invention also relates to a polymerization process for preparing a polymer of ethylene or a copolymer of ethylene and one or more comonomers of $C_3$-$C_{10}$ alpha-olefins, the copolymer containing at least about 80 percent by weight of ethylene units. The polymerization process is conducted in the presence of the catalyst prepared by the process comprising the steps set forth above. The polymerization process surprisingly produces polymers having increased bulk density as compared to polymers prepared with catalysts wherein the solid porous carrier is heated in a nitrogen atmosphere.

DETAILED DESCRIPTION OF THE INVENTION

Figure 1:
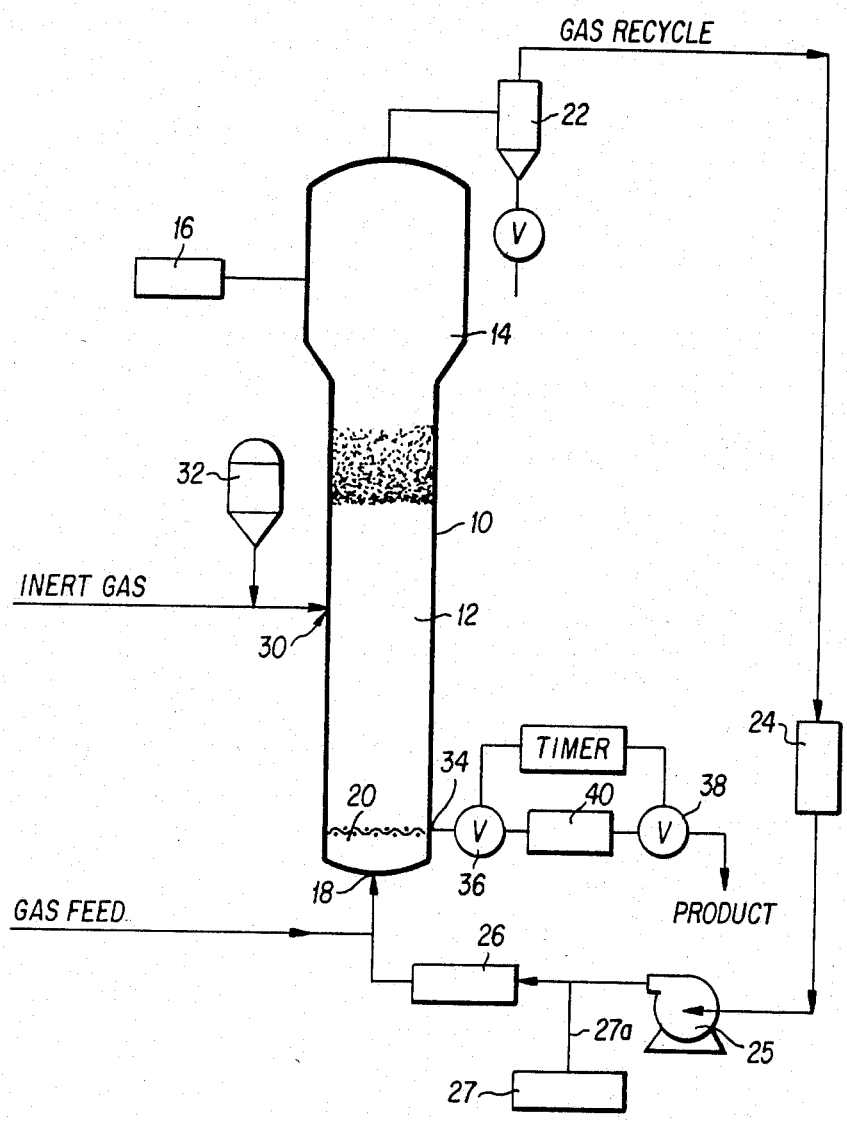
FIG. 1 is a diagrammatic illustration of a fluid bed process for producing polyethylene, such as linear low density polyethylene (LLDPE).

The oxygen-containing gas used in step (i) of the process of preparing the catalyst is any gas comprising oxygen but substantially free of water vapor ($H_2O$).

Thus, the gas may contain not more than 50 ppm, preferably not more than 5 ppm and most preferably not more than 0.5 ppm by volume of such water vapor. The gas comprises at least 1%, usually about 10% to about 100%, preferably about 15% to about 50% by volume of oxygen. In the most preferred embodiment, the gas is amoient air which usually comprises about 21% by volume of oxygen. The gas is heated to the desired temperature and the solid porous carrier is then contacted with the heated gas. The manner of contacting the porous carrier with the heated gas or the apparatus in which such contact takes place are not crucial to this invention. The carrier can be contacted with the gas in any conventionally-used apparatus. In the embodiment that is most preferred because it is most convenient and requires the least amount of modifications from the prior art techniques, the carrier is contacted with the heated gas, most preferably air, in a fluidized bed reactor.

The length of time that the carrier is in contact with the heated gas (residence time of the carrier in the gas-carrier contact apparatus) is also conventional for this type of catalyst. The residence time is such that it is sufficient to obtain a solid porous carrier containing a desired amount of active OH groups, as specified below.

As the experimental data discussed in detail below indicates, the substitution of an oxygen-containing gas for a substantially pure nitrogen gas used in prior art to heat the solid, porous carrier, unexpectedly produces a catalyst exhibiting at least about 25% improvement in productivity (defined as grams of polymer produced per gram of catalyst in a gas-phase reactor). The modified carrier heating procedure also unexpectedly produces a polymer product whose bulk density, defined as mass of granular polymer per unit volume, is at least about 5%, and usually about 11%, higher than that of polymers prepared with similar catalysts prepared in an identical manner except for the step of heating the solid, porous carrier in a substantially pure nitrogen atmosphere. These two unexpected and surprising advantages substantially lower the overall cost of the polymer product.

The aforementioned advantages, and the magnitude thereof, obtained by substituting an oxygen-containing gas for nitrogen in the heating step of the catalyst synthesis process of this invention are unexpected and surprising, especially because it was heretofore thought that heating the carrier in an oxygen-containing gas is equivalent to heating it in a nitrogen atmosphere.

As used herein, the concept of incorporating a material onto a carrier in the catalyst synthesis process is intended to encompass the incorporation of the material (e.g., magnesium compositions and transition metal compounds) onto the carrier by physical or chemical means. Accordingly, the incorporated material need not necessarily be chemically bound to the carrier.

Catalysts produced according to the present invention are described below in terms of the manner in which they are made.

Suitable carrier materials wnich may be used herein include solid, porous carrier materials, such as silica, alumina and combinations thereof, which contain reactive OH groups. A suitable carrier is a material which, when it is contacted with the first liquid containing the organomagnesium composition, contains water as represented by the hydroxyl (OH) groups in the amount of about 0.1 mmoles or more of OH groups per gram of carrier, preferably about 0.1 to about 2.0 mmoles of OH groups per gram of carrier, and most preferably about 0.3 to about 0.5 mmoles of OH groups per gram of carrier. Such carrier materials may be amorphous or crystalline in form.

Examples of suitable carrier materials are described in Graff, U.S. Pat. No. 4,173,547, the entire contents of which are incorporated herein by reference. Internal porosity of carriers can be determined by a technique termed BET-technique, described by S. Brunauer, P. Emmett and E. Teller in *Journal of the American Chemical Society*, 60, pp. 209-319 (1938). Specific surface areas of carriers can also be measured in accordance with the aforementioned BET-technique, with the use of the standardized method, as descrioed in *British Standards* BS 4359, Volume 1, (1969).

Further examples of suitable carrier materials are given in Stevens et al., U.S. Pat. No. 3,718,636, the entire contents of which are incorporated herein by reference. Polymeric silicas, known as polysiloxanes, can also be used as suitable carrier materials.

The carrier materials may be in the form of particles having a particle size of from about 0.1 micron to about 200 microns, more preferably from about 10 to about 150 microns. Preferably, the carrier is in the form of spherical particles, e.g., spray dried silica. The internal porosity of the carriers is larger than 0.2 $cm^3$/gr, preferably larger than about 0.6 $cm^3$/gr. The specific surface area of the carriers is larger than about 50 $m^2$/gr, preferaoly from about 150 to about 1500 $m^2$/gr. In the most preferred embodiment, the carrier is silica which has been dehydrated by fluidizing it with air and heating at about 800° C. for about 8 to 10 hours to achieve a surface hydroxyl group concentration of about 0.4 mmols/gr. The silica of the most preferred embodiment is a high surface area, amorphous silica (surface area at about 330 $m^2$/gr; pore volume of about 1.50 $m^3$ per gram), and it is a material marketed under the tradename of Davison 955 by the Davison Chemical Division of W. R. Grace and Company. The silica is in the form of spherical particles, e.g., as obtained by a spray-drying process.

It is desirable to remove physically bound water from the carrier material prior to contacting the material with water-reactive magnesium compounds. The water removal step may be accomplished by heating the carrier material in an oxygen-containing gas to a temperature of from about 100° C. to an upper limit of temperature represented by the temperature at which a change of state or sintering occurs. A suitable range of temperatures is, from about 100° C. to about 1000° C., preferably from about 150° C. to about 850° C., yet more preferably from about 750° C. to about 850° C. and most preferably about 800° C.

Chemically bound water, e.g., as represented by the presence of the OH groups on the carrier, may be present when the carrier is contacted with water-reactive organomagnesium compounds in accordance with the present invention. Excess OH groups present in the carrier may be removed by heating the carrier, prior to the contacting step, for a sufficient time at a sufficient temperature to accomplish the desired degree of the OH groups removal. For example, a relatively small number of OH groups may be removed by sufficient heating at from about 150° C. to about 250° C., whereas a relatively large number of OH groups may be removed by sufficient heating at at least 500° or 600° C., preferably from about 750° C. to about 850° C. The heating is continued for about 4 to about 16 hours. The amount of the hydroxyl groups in silica may be determined according to the method disclosed by J. B. Peri and A. L. Hensley, Jr., in *J. Phys. Chem.*, 72 (8), 2926 (1968), the entire contents of which are incorporated herein by reference.

While heating is the most preferred means of removing the OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound, e.g., triethylaluminum.

A dehydrated carrier material is treated with a solution of a solid organomagnesium composition in a first liquid, the organomagnesium composition being capable of reacting with a transition metal compound. The organomagnesium composition has the formula $R_nMgR'_{(2-n)}$, where R and R' are the same or different and they are $C_1$-$C_{12}$ hydrocarbyl groups, preferably $C_1$-$C_4$ alkane groups, and yet more preferably $C_2$-$C_4$ alkane groups, provided that R' may also be halogen, preferably bromine or chlorine, and most preferably chlorine, and n is 0, 1 or 2. In a preferred embodiment, a solution of such an organomagnesium composition is a Grignard reagent and the carrier material is contacted with the solution thereof in the absence of ball milling.

Grignard reagents are described in *Organic Chemistry*, Second Edition, Morrison and Boyd, Second Edition, fifth printing, May 1968, pp. 112–114 and 516–521, the entire contents of which are incorporated herein by reference. Grignard reagents are known to react with organic molecules or moieties which have hydrogen bonded directly to a nitrogen or oxygen atom. Furthermore, Grignard reagents are also known to react with organic molecules or moieties containing carbonyl groups, cyano groups and nitro groups. Accordingly, the groups defined by R in the above-mentioned formula generally should not be any of the aforementioned groups indicated as being reactive with Grignard reagents. Examples of R and R' include $C_1$-$C_{12}$ hydrocarbyl groups (e.g., $C_1$-$C_{12}$ alkyl or $C_6$-$C_{12}$ aryl) or $C_1$-$C_{12}$ alkoxy groups, which may be unsubstituted or substituted, e.g., with one or more halogens (e.g., F, Cl, Br or I) or with $C_1$-$C_{12}$ alkoxy groups. In the most preferred embodiment, ethylmagnesium chloride is the compound represented by the formula $R_nMgR'_{(2-n)}$.

It is noted that even a Grignard reagent of ethylmagnesium chloride may contain a mixture of molecules other than ethylmagnesium chloride, per se. For example, particularly under the influence of various liquids or solvent systems, ethylmagnesium chloride may disproportionate to form substantially a mixture of magnesium dichloride and diethylmagnesium. Such mixtures are intended to be encompassed by the formula $R_nMgR'_{(2-n)}$. Accordingly, it will be understood that compositions of the formula $R_nMgR'_{(2-n)}$ are intended herein to represent the overall empirical formula of these compositions rather than to set forth the molecular formula thereof.

Preferably, the carrier is treated with the aforementioned solution in such a manner that, after the treatment is completed, the carrier has magnesium incorporated into the pores thereof. A preferred means of accomplishing this result is by adding a porous carrier to a first liquid containing a dissolved organomagnesium composition of the formula $R_nMgR'_{(2-n)}$ and maintaining it in the suspension for about 0.1 to about 10, preferably about 0.5 to about 5, and most preferably for about 1.0 to about 2.0 hours (hrs) at a temperature of about 25° C. to about 200° C., preferably about 50° C. to about 100° C., and most preferably about 60° C. to about 80° C. As a result of this treatment, magnesium becomes incorporated into the pores of the carrier by (1) a chemical reaction of the organomagnesium composition with the carrier, by (2) a precipitation of magnesium from the organomagnesium composition onto the carrier or by (3) a combination of such a reaction and precipitation.

Organomagnesium compositions corresponding to those found in Grignard reagents have the formula RMgX, where R is as defined hereinabove and X is halogen (e.g., Cl, Br or I), and they are soluble in ethers. Suitable ethers are known in the art, e.g., see Yamaguchi et al, U.S. Pat. No. 3,989,881, column 4, lines 32–49, the entire contents of this patent being incorporated herein by reference, and they include aliphatic ethers, such as diethyl ether, diisopropyl ether, dibutyl ether, dipentyl ether and ethyl-n-butyl ether; and cyclic ethers, such as tetrahydrofuran and dioxane. Without wishing to be bound by any theory of operability, it is thought that the reason for the ability of such ethers (e.g., diethyl ether) to solubilize the Grignard reagents (e.g., $C_2H_5MgCl$) is by virtue of the ability of the magnesium atom to act as a Lewis acid and to associate with at least one electron pair from the etheric oxygen which acts as a Lewis base. Such an association is represented as follows:

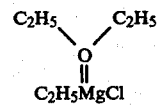

Thus, the first liquid containing the organomagnesium composition is usually an ether, preferably tetrahydrofuran. Although organomagnesium compounds of the formula RMgX tend to be insoluble in non-Lewis base solvents, such as hexane, they may be completely soluble in mixed solvent systems, such as hexane/tetrahydrofuran, provided that a sufficient solubilizing amount of the Lewis base solvent is present. Thus, a carrier may be slurried in a non-Lewis base co-solvent and an organomagnesium compound may be added thereto in the form of an ether solution thereof. Suitable non-Lewis base co-solvents are also known in the art, see e.g., Graff, U.S. Pat. No. 4,173,547, column 6, line 61 to column 7, line 8. These co-solvents include straight or branched saturated aliphatic hydrocarbons, such as butanes, pentanes, hexanes, heptanes, or commonly available mixtures thereof, generally known as gasoline, kerosene, gas, oil or other petroleum fractions. Further, such co-solvents include cyclic hydrocarbons, such as cyclopentane, cyclohexane, methylcyclohexane, as well as aromatic hydrocarbons, such as benzene or halogen-aromatic hydrocarbons, such as chlorobenzene. Such co-solvents should preferably not contain groups which are reactive with the organomagnesium composition. A preferred co-solvent is n-hexane.

The amounts and concentrations of the organomagnesium/ether solution which is added to the co-solvent/carrier slurry are preferably sufficient to assure that the organomagnesium composition is at least partially soluole in the co-solvent/solvent system. Thus, this amount is dependent upon many factors, such as the composition of solvents, the organomagnesium composition and the temperature of the co-solvent/solvent system. The selection of proper amounts and concentrations of organomagnesium/ether solutions is well within the skill of those of ordinary skill in the art. For example, when an ethylmagnesium chloride/tetrahydrofuran solution is added to a hexane/carrier slurry, the concentration of the ethylmagnesium chloride/tetrahydrofuran solution may be from about 0.1 to about 10 Molar, preferably from about 1 to about 3 Molar.

For example, when 107 g of silicic acid are suspended in 500 ml of n-neptane and 342 ml of a solution of 172 mmols of n-propyl magnesium chloride in diethyl ether are added thereto in accordance with Example 1 of Strobel et al, U.S. Pat. No. 4,148,754, the n-propyl magnesium chloride may well be totally soluble in the n-heptane/diethyl ether mixture. However, when 15 g of silica are slurried in 200 ml of n-hexane and 50 ml of a 2.0 molar solution of ethylmagnesium chloride in tetrahydrofuran is added thereto, the ethylmagnesium chloride appears to be only partially soluble in the n-hexane/tetrahydrofuran mixture.

A carrier material may also be incorporated with an organomagnesium composition by suitably contacting the carrier material with a liquid containing an organomagnesium composition of the formula $R_nMgR'_{(2-n)}$ in a partially dissolved state. More particularly, the carrier material may be slurried in one of the above-exemplified non-Lewis base co-solvents, such as hexane, and a solution of an organomagnesium composition in a liquid, such as ether, may be added thereto, the amount of the liquid relative to the amount of co-solvent being sufficient to only partially solubilize the organomagnesium composition. The non-soluole portion of the organomagnesium composition may be in the form of a halomagnesium, e.g., dihalomagnesium, the amount of this non-soluble halomagnesium being essentially equivalent to an amount of dialkylmagnesium remaining soluble in the solvent/co-solvent mixture.

It is noted that if the organomagnesium composition is only sparingly soluble in the liquid, e.g., to the extent of about 1 percent or less, reactive organomagnesium composition which is consumed by reactive sites on the carrier will be replaced by further dissolution of undissolved organomagnesium composition by a mass action effect.

Another example of a method of incorporating an organomagnesium composition onto a carrier material is to slurry the carrier material in a Lewis base solvent, such as an ether, and to add a solution of organomagnesium composition in ether to this slurry. The addition of organomagnesium/ether solution to ether or co-solvent/carrier slurry usually takes place as a gradual continuous dropwise addition while the liquid medium of the slurry is maintained under reflux conditions. Without wishing to be bound by any operability theory, it is thought that, upon such addition, dissolved organomagnesium composition may react with the carrier at the site of reactive OH groups, if any, present on the available surface area of the carrier. Such a reaction may be described for ethylmagnesium chloride as follows:

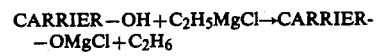

CARRIER—OH+$C_2H_5MgCl$→CARRIER—OMgCl+$C_2H_6$

Accordingly, it may be possible to incorporate an organomagnesium composition onto a carrier by reacting an organomagnesium composition with reactive OH groups of the carrier.

Another means of incorporating a magnesium composition onto a carrier is to precipitate a magnesium compound or compounds from an organomagnesium composition from a liquid solvent onto a carrier. This precipitation may take place by any possible convenient means, including cooling of the solvent, using a sufficiently large amount of non-solvent in the initial slurry to precipitate the magnesium compound(s) within the carrier, adding non-solvent to the slurry to cause the precipitation of the magnesium compound(s) within the carrier, or stripping of solvent. In the case of a carrier slurry where the liquid solvent is essentially a hexane/tetrahydrofuran solution of ethylmagnesium chloride, it is preferred to precipitate ethylmagnesium chloride onto the carrier by distillation of the solvent. In this regard, it is noted that tetrahydrofuran and hexane have nearly equivalent boiling points. Thus, it would be expected that during the course of distilling these solvents, the ratio of tetrahydrofuran to hexane in the liquid state would remain substantially constant. On the other hand, if the boiling point of the co-solvent is significantly greater than the boiling point of the ether, then the relative concentration of the co-solvent may increase appreciably as the distillation proceeds. In such a case, a non-uniform precipitation of a magnesium compound may occur, such that any magnesium halide, e.g., magnesium dihalide, which may be present tends to precipitate before organomagnesium is precipitated.

In view of the above discussion, it will be understood that at least three possible types of magnesium-containing compounds on the carrier can be obtained. The first type is essentially one or more reaction product of an organomagnesium composition with a carrier having OH functionalities (i.e., OH groups) which are reactive with the organomagnesium composition. This product contains substantially no precipitated magnesium compound(s). Examples of such reaction products are given in the aforementioned Stevens et al., U.S. Pat. No. 3,787,384 and Strobel et al., U.S. Pat. No. 4,148,754.

A second type of product is substantially one or more magnesium compound which is incorporated onto the carrier by means other than those mentioned above, i.e., it is not a reaction product of an organomagnesium composition with a carrier having reactive OH functionalities. This product contains substantially no reaction product of an organomagnesium composition with the carrier. Such a product is obtained when an organomagnesium composition is precipitated onto a carrier having essentially no OH functionalities reactive with the organomagnesium composition.

A third type of product contains both, one or more reaction product(s) of an organomagnesium composition with the carrier and precipitated organomagnesium composition(s). Such a product is obtained when an excess of organomagnesium composition, with respect to the OH functionalities, is reacted with a carrier containing such reactive OH functionalities.

Accordingly, at least one magnesium-containing compound may be incorporated onto a carrier in either an unreacted form or in a reacted form or a combination of both forms. Without wishing to be bound by any theory of operability, it is believed that the reactive form of the magnesium-containing compound is obtained by the reaction of reactive hydroxyl groups of the carrier with an organomagnesium composition. However, regardless of the possible mechanism of incorporating the magnesium-containing compound onto the carrier, it is important for the purposes of the present invention that the number of moles of the organomagnesium composition in the solution used to contact the carrier is in excess of the number of moles of OH groups on the carrier, so that the molar ratio of the organomagnesium composition in the solution to the hydroxyl groups is greater tnan 1.0, preferably it is from about 1.1 to about 3.5, and most preferably from about 2.0 to about 3.5.

It is also important for the purposes of the present invention, that the number of moles of the sum of all magnesium-containing compounds on the carrier, in the product of the third step, designated above as step (iii), of the synthesis of the catalyst of this invention, is in excess of the number of moles of OH groups present on the carrier after the heating step (i) is completed. The molar ratio of the sum of all magnesium-containing compounds in the product of the third step to the aforementioned OH groups is greater than 1, preferably it is from about 1.1 to about 3.5 and most preferably from about 2.0 to about 3.5.

To assure that most, if not all, of the magnesium-containing compound(s) are retained on the carrier, the liquid is removed from the reaction vessel with care to assure that none or very little magnesium-containing compound(s) are removed with it. The liquid may be removed by any means assuring that substantially all of the magnesium-containing compound(s) remain on the carrier, e.g., by distillation of the mixture of the impregnated carrier and the solvents, evaporation, decantation or centrifugation. Evaporation at about the boiling point of the liquid is the most preferred method of liquid removal. It is also important that the product of the third reaction step is not washed so that the excess of the magnesium-containing compound or compounds, which did not react with the hydroxyl (OH) groups of the carrier, is retained on the carrier. After the liquid is removed, the resulting product is dried by any conventional means, e.g., drying at ambient temperature or at 50°–80° C. for about 12–16 hours with a stream of dry nitrogen to produce a free-flowing powder.

Whether the magnesium-containing compounds are in the form of a reaction product with the carrier or in the form of a non-reacted precipitate, it is noted that the magnesium-containing compounds may, optionally, be in the form of a complex with one or more electron donating agents (i.e., Lewis bases). For example, when ethylmagnesium chloride is precipitated from a hexane/tetrahydrofuran solution, each mole of the ethylmagnesium chloride precipitated may be complexed with approximately one mole of tetrahydrofuran. In more general terms, when an organomagnesium composition is precipitated from a solution containing an ether, the resulting precipitate may have molecules of this ether complexed with molecules of the organomagnesium composition.

The amount of magnesium-containing compound(s) which is incorporated onto the carrier should be sufficient to react with the transition metal compound in order to incorporate a catalytically effective amount of the transition metal on the carrier in the manner set forth hereinbelow. Thus, the carrier should comprise from about 0.1 to about 50, preferably about 0.1 to about 5 millimoles (mmoles) of magnesium per gram of carrier (after the treatment of the carrier with the organomagnesium composition is completed). When the first liquid containing an organomagnesium composition is contacted with a carrier, the amount of magnesium in this liquid in terms of mmoles may be essentially the same as that stated above which is incorporated onto the carrier.

When a non-Lewis base co-solvent is used to slurry the carrier, an amount of such co-solvent sufficient to slurry such a carrier is used, e.g., from about 2 to about 100 milliliters (mls), preferably from about 5 to about 15 mls, of such co-solvent may be present per gram of carrier.

While the above-exemplified methods of incorporating a solid reactive organomagnesium composition onto a carrier are preferred, it will be understood that alternative methods are available. For instance, it is possible to precipitate a dialkylmagnesium composition onto a carrier from a hydrocarbyl or halohydrocarbyl solvent containing essentially no ether. It is also possible to combine a carrier and a solid organomagnesium composition in the absence of a solvent by means of a ball milling device. However, the use of such a ball milling device is not desiraole, particularly because it does not tend to effectively incorporate a reactive magnesium compound into the pores of the carrier.

Mechanical shearing means, such as ball milling, are not necessary to achieve the desired manner of incorporation of the catalyst onto the carrier in accordance with the present invention. Accordingly, a ball milling process, such as that described in Examples 2–5 of Grant, U.S. Pat. No. 3,821,186, is unnecessary and should be avoided. Moreover, a ball milling process may tend to disrupt the particle size and morphology of the carrier. Since catalysts made in accordance with the present invention are capable of being used in gas phase, fluid bed polymerization processes, e.g., as described by Karol et al. U.S. Pat. No. 4,302,566, the particle size and morphology of the catalyst may be critical. Accordingly, another reason for avoiding ball milling is to preserve the particle size and morphology of the carrier while it is being treated in accordance with the process of the present invention.

The free-flowing powder obtained in the third step of the catalyst synthesis process is reacted with at least one transition metal compound dissolved in a second liquid, also referred to herein as a liquid medium diluent. Suitable transition metal compounds are titanium, e.g., tetravalent titanium compounds, such as TiCl4, and vanadium, e.g., tetravalent vanadium compounds. In the most preferred embodiment of this invention, one or more tetravalent titanium compound is the transition metal compound used in step (iv) of the catalyst synthesis process.

Since the catalyst synthesis and activation conditions for all embodiments of the invention are identical, for the sake of simplification, the invention will be described below in detail only with respect to the embodiment utilizing, in step (iv) of the catalyst synthesis process, the most preferred transition metal compound, i.e., a tetravalent titanium compound. It will be understood by those skilled in the art, however, that process and reaction conditions described below for that emoodiment can be applied to all other embodiments of the invention.

The tetravalent titanium compound is soluble in the second liquid, while the treated carrier (i.e., the free-flowing powder), including the magnesium-containing compound(s), is insoluble therein. Thus, the reaction which takes place between the tetravalent titanium and the reactive magnesium-containing compound(s) is a reaction of a solid with a liquid. It is further noted that the reacted titanium is insoluble in the liquid reaction medium.

Without wishing to be bound by any theory of operability, it is thought that the reaction which takes place between (a) the magnesium compound which is not a reaction product of an organomagnesium composition with a carrier and (b) the tetravalent titanium in the liquid reaction medium is essentially an oxidation/reduction reaction, wherein the magnesium compound acts as a reducing agent for the tetravalent titanium. On the other hand, while not wishing to be bound by any particular theory or chemical mechanism, the reaction which takes place between (1) tetravalent titanium and (2) the reaction product of an organomagnesium composition and the carrier containing reactive OH groups is not an oxidation/reduction reaction. However, it is noted that both of the above-mentioned reactions lead to the incorporation of titanium onto the carrier.

The tetravalent titanium compound or compounds which can be used are any titanium compounds soluble in the liquid medium used in the fourth (iv) catalyst synthesis step, such as, titanium halides, e.g., titanium tetrachloride, TiCl4, titanium tetrabromide, TiBr4, titanium alkoxides, wherein the alkoxide moiety has a branched or unbranched alkyl radical of 1 to about 20 carbon atoms, preferably 1 to about 6 carbon atoms. The most preferred titanium compound is titanium tetrachloride.

Mixtures of such titanium compounds may also be used and generally no restrictions are imposed on the titanium compounds which may be included. Any titanium compound that may be used alone may also be used in conjunction with other titanium compounds.

Suitable liquid medium diluents are materials in which the tetravalent titanium compounds are at least partially soluble and which are liquid at reaction temperatures. Preferred diluents are alkanes, such as hexane, n-heptane, octane, nonane, and decane, although a variety of other materials including cycloalkanes, such as cyclohexane, aromatics, such as benzene and ethylbenzene, and halogenated and hydrogenated aromatics, such as chlorobenzene, ortho-dichlorobenzene, can also be employed. The most preferred diluent is n-heptane. Prior to use, the diluent should be purified, such as by percolation through silica gel and/or molecular sieves, to remove traces of water, oxygen, polar compounds, and other materials capable of adversely affecting catalyst activity. The magnesium-containing dry, free-flowing powder is reacted with the tetravalent titanium compound at a temperature and for a time sufficient to yield a solid catalyst component (also referred to herein as a catalyst precursor). Temperatures at which this reaction is conducted range from about −40° to about 250° C., preferably, from about 0° to about 170° C., and most preferably, the reaction is conducted at a temperature of 25°–100° C. Suitable reaction times range from about ½ to about 25 hours, with about ½ to about 6 hours being preferred.

The reaction of the tetravalent titanium in the liquid medium with the magnesium-containing carrier material conveniently takes place by slurrying the solid carrier in a solution of the tetravalent titanium compound in the diluent and heating the liquid reaction medium to a suitable reaction temperature, e.g., to the reflux temperature of the diluent at standard atmospheric pressure. Thus, the reaction may take place under reflux conditions.

The various reaction parameters can be widely varied, suitable selection of such parameters being well within the skill of those having ordinary skill in the art. The volume of the tetravalent titanium compound solution added to the magnesium-containing powder initially slurried in the solution may be from about 0.1 to about 10 millimeters (mls) per gram of such carrier. The concentration of the titanium compound solution may be, for example, from about 0.1 to about 5 Molar. It is important, however, that the molar amount of the tetravalent titanium compound in the solution is in excess of the molar amount of the organomagnesium composition used to treat the carrier in the first step of the catalyst sythesis. Thus, the molar ratio of the tetravalent titanium to the organomagnesium composition is from about 1 to about 10, preferably from about 3 to about 6. Unreacted titanium may be removed by any suitable separation techniques, such as decantation, filtration and/or washing.

After the reaction is completed, the slurry, formed by the reaction mixture, is filtered, washed with a suitable washing agent, e.g., an alkane, such as hexane, and dried in an inert atmosphere, e.g., nitrogen. The thus-obtained catalyst precursor is then combined with a catalyst activator, in the manner and proportions discussed above, to form an active catalyst composition.

Steps (ii) through (iv) of the catalyst synthesis process of the present invention, and the step of combining the catalyst precursor with a catalyst activator, are conducted substantially in the absence of water, oxygen, and other catalyst poisons. Such catalyst poisons can be excluded during the aforementioned catalyst preparation steps by any well-known methods, e.g., by carrying out the preparation under an atmosphere of nitrogen, argon or other inert gas. An inert gas purge can serve the dual purpose of excluding external contaminants during the preparation and removing undesirable reaction by-products resulting from the preparation of the neat, liquid reaction product. Purification of any diluent employed in the third and fourth preparative steps in the manner described above also is helpful in this regard.

It may also be possible to replace some or all of the above-mentioned tetravalent titanium compounds with one or more other transition metal compounds. Such other transition metal compounds are exemplified in Graff et al., U.S. Pat. No. 4,173,547, column 6, lines 55–60. Preferred replacing transition metal compounds include zirconium compounds (e.g., $ZrCl_4$.

The catalyst precursor obtained in step (iv) of the catalyst synthesis method is then combined with a catalyst activator, also known as a catalyst promoter. The catalyst activator or promoter used herein is any one of the well known polymerization catalyst activators. The activators include any of the materials commonly employed for such purpose for olefin polymerization catalyst components containing compounds of the Group IVA, VA or VIA metals (as defined in the Periodic Chart of tne Elements, published by Fisher Scientific Company, Catalog Number 5-702-10). Examples of the promoters include Group IB, IIA, IIB, IIIB and IVB metal alkyls, hydrides, alkylhydrides, and alxylhalides, such as alkyllithium compounds, dialkylzinc compounds, trialkylboron compounds, trialkylaluminum compounds, alkylaluminum halides and hydrides, and tetraalkylgermanium compounds. Mixtures of activators can also be employed. Specific examples of useful promoters include n-butyllithium, dietnylzinc, di-n-propylzinc, triethylboron, triethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide, and hydride, tetramethylgermanium, and tetraethylgermanium. Organometallic promoters which are preferably used in accordance with this invention are the Group IIIB metal alkyls and dialkylhalides and trialkylhalides having 1 to about 20 carbon atoms per alkyl radical More preferably, the promoter is a trialkylaluminum compound having 1 to about 6 carbon atoms per alkyl radical. The most preferred promoter is triethylaluminum (TEAL.)

The catalyst may be activated in situ by adding the activator and catalyst separately to the polymerization medium. It is also possible to combine tne catalyst and activator before the introduction thereof into the polymerization medium, e.g., for up to about 2 hours at a temperature of from about $-40°$ to about $80°$ C. In a preferred embodiment, the activator is introduced into a fluidized bed polymerization process reactor simultaneously with, but separately from, the catalyst precursor an active polymerization catalyst composition. Normally, the ratio of the promoter to the precursor, either in a slurry or in a fluidized bed reaction process is about 0.3 to 1.5, depending on ethylene partial pressure in the reactor and other variables.

Catalysts of the present invention exhibit high levels of productivity and excellent stability.

Alpha-olefins are preferably polymerized with the catalysts prepared according to the present invention in gas phase polymerization reactions, e.g., those taking place in stirred bed reactors and, especially, fluidized bed reactors.

The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about $30°$ to about $105°$ C. This control of molecular weight may be evidenced by a measurable positive melt index of the polymer produced.

The molecular weight distribution of the polymers prepared in the presence of the catalysts of the present invention, as measured by the melt flow ratio (MFR) values, varies from about 26 to about 50 for HDPE products having a density of about 0.945 to about 0.960, and a $I_2$ melt index of about 0.1 to about 100, and from about 28 to about 50 for LLDPE products having a density of about 0.915 to about 0.940, and an $I_2$ melt index of about 0.1 to about 100. As is known to those skilled in the art, higher MFR values are indicative of a relatively broad molecular weight distribution of the polymer.

The catalysts prepared according to the present invention are highly active and may have an activity of at least about 500–7,000 grams of polymer per gram of catalyst per 100 psi of ethylene in about 3 hours.

Advantageous properties of linear low density polyethylene polymers are described by Anderson et al, U.S. Pat. No. 4,076,698. The linear low density polyethylene polymers prepared in accordance with the present invention are polymers of ethylene alone and preferably copolymers of ethylene with one or more $C_3$–$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene polymer preferably has at least one other alpha-olefin comonomer having at least four carbon atoms in an amount of at least 1 percent by weight of the polymer. Accordingly, ethylene/propylene copolymers are possible, but not preferred. The most preferred polymer is a copolymer of ethylene and 1-hexene.

The linear low density polyethylene polymers produced in accordance with the present invention preferably contain at least about 80 percent by weight of ethylene units.

A particularly desirable method for producing linear low density polyethylene polymers according to the present invention is in a fluid bed reactor. Such a reactor and means for operating same is described by Levine et al., U.S. Pat. No. 4,011,382 and Karol et al., U.S. Pat. No. 4,302,566, the entire contents of both of which are incorporated herein by reference.

A preferred process for conducting a gas phase, fluid bed polymerization is described below.

The polymerization reaction is conducted by contacting a stream of the monomers, in a gas phase process, such as in the fluid bed process described below, and substantially in the absence of catalyst poisons, such as moisture, oxygen, CO, $CO_2$, and acetylene, with a catalytically effective amount of the completely activated catalyst at a temperature and at a pressure sufficient to initiate the polymerization reaction.

In order to achieve the desired density ranges in the copolymers, it is necessary to copolymerize a sufficient amount of the comonomers having three or more carbon atoms with ethylene to achieve a level of 0 to about 20 mol percent of the $C_3$ to $C_8$ comonomer in the copolymer. The amount of comonomer needed to achieve this result depends on the particular comonomer(s) employed.

Thus, 1-hexene can be incorporated into an ethylene polymer chain in a gas phase reactor in amounts up to 20 percent by weight, preferably about 5 to about 12 percent by weight. The reaction is preferably conducted in a fluid bed reactor using the catalyst of the invention.

A fluidized bed reaction system which can be used in the process of the present invention is illustrated in FIG. 1. With reference thereto, a reactor 10 consists of a reaction zone 12 and a velocity reduction zone 14.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. The term $G_{mf}$ is used herein in the accepted form as the abbreviation for the minimum mass gas flow required to achieve fluidization, see C. Y. Wen and Y. H. Yu, "Mechanics of Fluidization", *Chemical Engineering Progress Symposium Series*, Vol. 62, p. 100–111 (1966).

It is essential that the bed always contains polymer particles to prevent the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When they are different, they are withdrawn with the desired formed polymer particles as the first product. Eventually, a fluidized bed of the desired polymer particles supplants the start-up bed.

The partially or completely activated catalyst used in the fluidized bed is preferably stored for service in a reservoir 32 under a blanket of a gas which is inert to the stored material, such as nitrogen or argon.

Fluidization is achieved by a high rate of gas recycle to and through the bed, typically on the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the weight of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To ensure complete fluidization, the recycle gas and, where desired, part of the make-up gas are returned to the reactor at point 18 below the bed. A gas distribution plate 20 is positioned above the point of return to aid fluidization of the bed.

The portion of the gas stream which does not react in the bed constitutes the recycle gas which is removed from the polymerization zone, preferably by passing it into a velocity reduction zone 14 above the bed where entrained particles are given an opportunity to return to the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surfaces and compressor blades.

The recycle gas is then compressed in a compressor 25 and then passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed, thereby maintaining itself at an essentially constant temperature under steady state conditions. The recycle gas is then returned to the reactor at its base 18 and to the fluidized bed through a distribution plate 20. The compressor 25 can also be placed upstream of the heat exchanger 26.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type, or any similar plate known in the art. The elements of the plate may all be stationary, or the plate may be of the mobile type disclosed in U.S. Pat. No. 3,298,792, the entire contents of which are incorporated herein by reference. Whatever the design of the plate, it must diffuse the recycle gas through the particles at the base of the bed to keep them in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction of the present invention. The ratio hydrogen/ethylene employed varies between about 0 to about 2.0 moles of hydrogen per mole of the ethylene monomer in the gas stream.

Any gas inert to the catalyst and reactants can also be present in the gas stream. The activator compound is preferably added to the reaction system at the hottest portion of the gas which is usually downstream from heat exchanger 26. Thus, the activator may be fed into the gas recycle system from dispenser 27 through line 27A. As discussed above, the rate of feed of the activator compound, for a given desired content of the activator compound in the polymer product, is a function of the rate of product polymer production. The rate of the polymer production is controlled by the timer controlling two timed valves 36 and 38, as discussed in detail below.

Zinc (Zn) compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the catalysts of the present invention as molecular weight control or chain transfer agents, that is, to increase the melt flow index values of the copolymers that are produced. About 0 to 50, and preferably about 20 to 30, moles of the Zn compound (as Zn) may optionally be used in the gas stream in the reactor per mole of titanium compound in the reactor. The zinc compounds are introduced into the reactor preferably in the form of a dilute solution (2 to 30 weight percent) in hydrocarbon solvent or absorbed on a solid diluent material, such as silica, of the types described above, in amounts of about 10 to about 50 weight percent. These compositions tend to be pyrophoric. The zinc compound may be added alone, or with any additional portions of the activator compound that are to be added to the reactor from a feeder, not shown, which could be positioned adjacent dispenser 27, near the hottest portion of the gas recycle system.

It is essential to operate the fluid bed reactor at a temperature below the sintering temperature of the polymer particles. To ensure that sintering will not occur, operating temperatures below the sintering temperature are desired. For the production of ethylene/1-hexene copolymers in the process of the present invention an operating temperature of about 30° to 115° C. is preferred, and a temperature of about 75° to 95° C. is most preferred. Temperatures of about 75° to 90° C. are used to prepare polymer products having a density of about 0.90 to 0.93 gms/cc, temperatures of about 85° to 100° C. are used to prepare products having a density of about 0.92 to 0.95 gms/cc, and temperatures of about 90° to 115° C. are used to prepare products having a density of about 0.94 to 0.96 gms/cc.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated catalyst is injected into the bed at a rate equal to its consumption at a point 30, which is above the distribution plate 20. Injecting the catalyst at a point above the distribution plate is an important feature of the process of this invention. Since the catalysts used in the practice of this invention are highly active, injection of the fully activated catalyst into the area below the distribution plate may cause polymerization to begin in that area and eventually cause plugging of the distribution plate. Injection into the viable bed, instead, aids in distributing the catalyst throughout the bed and tends to preclude the formation of localized spots of high catalyst concentration which may result in the formation of "hot spots".

A gas which is inert to the catalyst, such as nitrogen or argon, is used to carry the partially or completely reduced precursor composition into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accommodate the change in the rate of heat generation. This ensures the maintenance of an essentially constant temperature in the bed. It will be apparent to those skilled in the art that complete instrumentation of both the fluidized bed and the recycle gas cooling system is necessary to detect any temperature change in the bed to provide a means for a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particulates settle to preclude further polymerization and sintering when the particles reach their ultimate collection zone. The suspending gas may also be used to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation.

Finally, the fluidized bed reactor is equipped with an adequate venting system to allow venting the bed during start up and shut down. The reactor does not require the use of stirring means and/or wall scraping means.

The highly active supported catalyst system of this invention yields a fluid bed product having a geometric mean particle size between about 0.005 to about 0.07 inches and preferably about 0.02 to about 0.05 inches.

The feed stream of a gaseous monomer, with or without inert gaseous diluents, is fed into the reactor at a space time rate of about 2 to 10 pounds/hour/cubic foot of bed volume.

The term virgin resin or polymer as used herein means polymer, in granular form, as it is recovered from the polymerization reactor.

Catalysts of the present invention are used to produce polymers having the desired combination of density and melt index by adjusting the gas phase partial pressure ratios in the reactor. Thus, e.g., the ratio of 1-hexene to ethylene primarily controls the product density, and the ratio of hydrogen to ethylene primarily controls the melt index. The catalysts of the present invention are particularly suitable for the production of polymers used in manufacturing low density films and injection molding products.

The following Examples further illustrate the essential features of the invention. However, it will be apparent to those skilled in the art that the specific reactants and reaction conditions used in the Examples are used only to illustrate the invention and are not intended to limit the scope thereof to the specific reactants and conditions illustrated in the Examples.

EXAMPLE 1

(Comparative Catalyst Preparation)

All procedures were carried out in glass or quartz equipment under purified nitrogen using pre-dried nitrogen-purged solvents.

Davison Silica Gel, Grade 952, was activated by fluidizing with nitrogen, heating at 800° C. for 9 hours and cooled to room temperature under nitrogen.

700 grams of the activated silica was introduced into a 10 liter cone-bottomed glass reactor fitted with a stirrer, thermometer, addition nozzle, dry nitrogen line and a distillation head to remove solvent. The reactor was contained in a water jacket maintained at a controlled temperature.

7 liters of hexane was added to the silica while stirring under a slow nitrogen purge. The silica/hexane slurry was brought to a reflux temperature of 70° C. and 483 mls of a 2.0M solution of ethylmagnesium chloride in tetrahydrofuran (THF) added slowly over a 4 minute period. The reflux was continued for an additional 60 minutes. The solvents were removed by distillation and the silica dried at approximately 80° C. under a nitrogen purge. This product was slurried with a pre-mixed solution of 390 mls of $TiCl_4$ dissolved in 6.5 liters of n-heptane, and the slurry refluxed for 2 hours, using the same apparatus as described above. The mixture was allowed to cool to room temperature. The solids were then washed 2 times with 7 liter portions of hexane and 3 times with 7 liter portions of isopentane, and dried under a nitrogen purge. 760 grams of catalyst precursor in the form of a free flowing tan colored powder was obtained. Analyses of the powder indicated that it contained 1.0 mmols of Mg/gram of catalyst and 0.75 mmols of Ti/gram of catalyst. This precursor was then combined with triethylaluminum (TEAL) activator, as set forth below in Example 3.

EXAMPLE 2

(Preparation of Catalyst)

A catalyst of the present invention was synthesized by following substantially the same preparative steps of Example 1, except that air was used in heating Davison Silica Gel, Grade 952, at 800° C. for 9 hours.

EXAMPLE 3

(Polymerization With Catalyst of Examples 1 and 2)

The catalysts of Examples 1 and 2 were used to polymerize ethylene and 1-hexene in a continuous fluidized bed reactor. The reaction zone contained approximately 50 kg of particulate resin in a volume of about 220 liters. The bed was fluidized with a gas flow of 40 to 50 cm/sec. Bed temperature was maintained constant by controlling the temperature of the fluidizing gas at the reactor inlet (designated by numeral 18 in FIG. 1).

The feed rate of ethylene was maintained constant for each experiment. The partial pressure of ethylene was controlled by adjustments in the catalyst feed rate. Increases in the catalyst feed rate produced proportional increases in reaction rate which, for a fixed feed rate of ethylene, lowered the ethylene partial pressure. Decreases in the catalyst feed rate produced higher ethylene partial pressures.

Gas phase partial pressure ratios of 1-hexene/ethylene and hydrogen/ethylene were continually monitored by a process gas chromatograph, and were controlled by adjustments in the feed ratio of 1-hexene and hydrogen, respectively.

The catalyst precursor and the TEAL activator were introduced into the reactor through two separate inlet ports and the rate of the introduction thereof was controlled independently. The TEAL feed rate was determined by the desired level of TEAL in the polymer product (150–175 ppmw). The TEAL feed rate was adjusted as required to maintain an approximately constant ratio of TEAL feed to polymer production rate.

The polymerization conditions were identical for both catalysts, and they are set forth below in Table 1.

TABLE 1

| Reactor Conditions | |
|---|---|
| Temperature | 87° C. |
| Ethylene ($C_2^=$) Partial Pressure | 85 ± 3 psi |
| TEAL Feed | 150–175 ppm |
| Resin Production Rate | 22 ± 1 lbs/hr. |
| Catalyst Residence Time | 4.9–5.2 hrs. |
| $H_2/C_2$ Partial Pressure Ratio | 0.25–0.28 |

The hexene/ethylene ($C_6/C_2$) gas phase partial pressure ratio was adjusted as required to produce a polymer within the target 0.918–0.920 gm/cc density range. Typical $C_6/C_2$ values were 0.120–0.130.

The catalyst of Example 2, made with air-activated silica, gave suprisingly high productivity as compared to that of Example 1 (5390 gms polymer/gm of Example 2 catalyst, compared to 4150 gms polymer/gm of Example 1 catalyst). Resin bulk density was also increased to 20.5 pounds per cubic foot from 17.8 pounds per cubic foot.

EXAMPLE 4

(Controlled Synthesis of Catalyst)

Two more catalyst samples were prepared from the same batch of raw silica to determine if different silica samples used in Examples 1 and 2 had any effect on the catalyst properties.

One of the catalyst samples (Example 4A) was prepared with air-activated silica, while the other with nitrogen-activated silica (Example 4B). Both catalyst samples were prepared by a procedure substantially the same as in Example 1.

Each of the catalyst samples had a nominal magnesium loading of 1.27 mmoles per gram of dry silica. These catalysts were then tested under standardized reactor conditions of Table 1. The results, shown below in Table 2, confirmed that the air activation produced a catalyst with higher productivity and bulk density than the nitrogen activation. The following table shows the combined results from four catalyst tests.

TABLE 2

| Catalyst of Example | Silica Activated by | Reaction Process Data | | |
|---|---|---|---|---|
| | | Productivity (gr/gr) | Resin Bulk Density (lbs/ft$^3$) | $C_6/C_2$ for 0.918 gr/cm$^3$ density |
| 1 | $N_2$ | 4150 | 17.8 | 0.133 |
| 4B | $N_2$ | 4450 | 19.4 | 0.123 |
| 2 | Air | 5390 | 20.5 | 0.124 |
| 4A | Air | 6330 | 20.0 | 0.129 |
| Average | $N_2$ | 4300 | 18.6 | 0.128 |
| Average | Air | 5860 | 20.7 | 0.127 |

The average productivity of the air activated catalysts was 36% higher than that of their nitrogen equivalents. Bulk density was higher by an average of 11%.

Other important variables in the reaction process include comonomer incorporation and TEAL response. Comonomer incorporation is a measure of the ability of the catalyst to incorporate hexene or other comonomer into the polymer chains. Catalysts with improved incorporation require lower $C_6/C_2$ gas phase ratios to reach a given (low) value of density. Table 2 shows the $C_6/C_2$ ratio required to reach 0.918 gr/cm$^3$ density at 2 melt index (MI$_2$). The indicated values range from 0.123 to 0.133. Experimental error for these measurements is ±6% (three standard deviations). Within this range of confidence, there is no difference indicated between the catalysts prepared with air and nitrogen-activated silica (0.127 average air vs. 0.128 average N$_2$).

TEAL response of the catalysts made with air-activated silica was not tested directly, but qualitatively the response seemed to be similar to that of the conventional catalysts of this type. With higher TEAL feeds, the productivity decreased, slightly as expected.

Resin samples from each of the four catalyst tests were analyzed for film strength and other important product properties.

The resin samples had densities between 0.918 and 0.920 gm/cc, and high load melt index (HLMI) values between 50 and 76. Product melt flow ratio (MFR) was essentially equal in all samples (34.3–36.2), indicating no difference between catalysts prepared with air and N$_2$ activated silica in this respect.

Film strength was measured in Elmendorf Machine Direction (MD) and Transverse Direction (TD) tear, and Spencer impact tests. Multiple determinations were made for each sample. Table 3 shows the measured average values and standard deviations. Within experimental error, there is no apparent difference in film strength between catalysts prepared with air and nitrogen activated silica.

rate from the reactor, the volume of resin discharged per unit time is reduced. This lowers the associated loss of ethylene and comonomer from the product discharge systems.

The higher bulk density also allows a small (1° C.) increase in safe reactor operating temperature because of the higher mass of resin in the fluid bed available to absorb heat of reaction. The higher temperature enables a 3–4% increase in maximum, heat transfer limited, production rate from the reactor.

EXAMPLE 5

(Controlled Synthesis of Catalyst)

Two more catalyst samples were prepared with a different type of silica—Davison 955—than that used in the synthesis of the catalysts of Examples 1, 2 and 4. The same batch of raw silica was used to prepare both catalyst samples.

One of the catalyst samples (Example 5A) was prepared with air-activated silica, while the other (Example 5B) with nitrogen activated silica. Both catalyst samples were prepared by a procedure substantially the same as that of Example 1. They were subsequently used to polymerize ethylene and 1-hexene in a fluid bed reactor of Example 3 under standardized reactor operating conditions of Table 2. Table 4 shows the test results.

TABLE 4

| Catalyst of Example | Silica Activated by | Productivity (gr/gr) | Resin Bulk Density (lbs/ft$^3$) | $C_6/C_2$ for 0.918 gr/cm$^3$ density |
|---|---|---|---|---|
| 5A | Air | 5940 | 23.7 | 0.141 |
| 5B | N$_2$ | 4980 | 24.0 | 0.135 |

The results indicate that air activation of the Davison 955 silica also produces alpha-olefin polymerization catalysts having increased productivity. The bulk density of the polymers prepared with these specific cata-

TABLE 3

| Catalyst of Example | Silica Activation by | No. of Samples | Density (gm/cc) | Melt Index[A] (MI$_{21}$) (gm/10 min.) | MFR[B] (MI$_{21}$/MI$_2$) | MD Tear[C] (gm/mil) | TD Tear[C] (gm/mil) | Spencer Impact[C] (gm/mil) |
|---|---|---|---|---|---|---|---|---|
| 1 | N$_2$ | 1 | 0.918 | 76.4 | 34.3 | 260 ± 52 | 543 ± 54 | 584 ± 116 |
| 4B | N$_2$ | 3 | 0.920 | 50.5 | 36.2 | 226 ± 26 | 605 ± 35 | 736 ± 85 |
| 2 | Air | 5 | 0.919 | 73.9 | 35.1 | 206 ± 18 | 560 ± 25 | 637 ± 57 |
| 4A | Air | 3 | 0.919 | 65.2 | 34.7 | 237 ± 27 | 542 ± 31 | 696 ± 80 |
| Average | N$_2$ | | 0.919 | 63.5 | 35.2 | 243 ± 24 | 574 ± 29 | 660 ± 66 |
| Average | Air | | 0.919 | 69.6 | 34.9 | 222 ± 16 | 551 ± 19 | 667 ± 47 |

[A] MI$_{21}$ ASTM D1238 Condition F
[B] MFR is the ratio MI$_{21}$/MI$_2$, ASTM D1238, Condition F/Condition E
[C] ± Range represents 95% confidence limits based on number of samples and typical standard deviations.

The results indicate that air activation of the silica improves the catalyst productivity and bulk density without impairment of other properties. The higher productivity allows the polymerization reactor to operate at lower ethylene partial pressure for improved monomer efficiency.

The increased bulk density gives a further improvement in monomer efficiency. For a given production lyst samples was substantially the same. Film strength and other product properties of the resin samples prepared with the catalysts of Examples 5A and 5B were determined in the same manner as described above in Example 4. The results, summarized in Table 5, below, indicate that, within experimental error, there is no apparent difference in film strength between catalysts prepared with air and nitrogen activated silica.

TABLE 5

| Catalyst of Example | Silica Activation by | No. of Samples | Density (gm/cc) | Melt Index[A] (MI$_{21}$) (gm/10 min.) | MFR[B] (MI$_{21}$/MI$_2$) | MD Tear[C] (gm/mil) | TD Tear[C] (gm/mil) | Spencer Impact[C] (gm/mil) |
|---|---|---|---|---|---|---|---|---|
| 5A | air | 3 | 0.918 | 53.6 | 33.3 | 289 ± 33 | 577 ± 33 | 817 ± 94 |

TABLE 5-continued

| Catalyst of Example | Silica Activation by | No. of Samples | Density (gm/cc) | Film Strength Properties | | | | |
|---|---|---|---|---|---|---|---|---|
| | | | | Melt Index[4] (MI$_{21}$) (gm/10 min.) | MFR[B] (MI$_{21}$/MI$_2$) | MD Tear[C] (gm/mil) | TD Tear[C] (gm/mil) | Spencer Impact[C] (gm/mil) |
| 5B | N$_2$ | 2 | 0.919 | 56.2 | 32.8 | 264 ± 37 | 591 ± 42 | 685 ± 97 |

[A]MI$_{21}$ ASTM D1238 Condition F
[B]MFR is the ratio MI$_{21}$/MI$_2$, ASTM D1238, Condition F/Condition E
[C]± Range represents 95% confidence limits based on number of samples and typical standard deviations.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

What is claimed is:

1. In a process for preparing a polymer of at least one C$_2$-C$_{10}$ alpha-olefin, the polymer containing at least about 80 percent by weight of ethylene units, the process comprising conducting the polymerization in the presence of a catalyst prepared by combining a catalyst precursor with at least one catalyst promoter, the catalyst precursor being prepared by a process comprising the steps of:

(i) heating a solid, porous carrier having reactive OH groups;

(ii) contacting the solid, porous carrier with a first liquid, said first liquid containing at least one organomagnesium composition having the empirical formula $$R_nMgR'_{(2-n)} \qquad (I)$$

where R and R' are the same or different and they are C$_1$-C$_{12}$ hydrocarbyl groups, provided that R' may also be a halogen, and n is 0, 1 or 2, the number of moles of said organomagnesium composition being in excess of the number of moles of said OH groups on said carrier;

(iii) removing said first liquid from step (i) to obtain a magnesium-containing carrier in the form of a dry, free-flowing powder; and (iv) contacting said powder of step (iii) with a solution comprising a second liquid and at least one transition metal compound, said transition metal compound being soluble in said second liquid, and said magnesium of said carrier being substantially insoluble in said second liquid, whereby a compound of transition metal, which is insoluble in said second liquid becomes incorporated onto said carrier;

an improvement comprising heating the solid, porous carrier in step (i) in the atmosphere of an oxygen-containing gas.

2. A process of claim 1 wherein a copolymer is prepared.

3. A process of claim 2 wherein the copolymer is selected from the group consisting of ethylene/1-butene, ethylene/1-hexene, ethylene/4-methyl-1-pentene, ethylene/1-butene/1-hexane, ethylene/propylene/1-hexene and ethylene/propylene/1-butene copolymers.

4. A process of claim 3 wherein the copolymer is a copolymer of ethylene and 1-hexene.

5. A process of claim 4 wherein the oxygen-containing gas comprises at least 1% by volume of oxygen.

6. A process of claim 5 wherein the oxygen-containing gas comprises 15% to 50% by volume of oxygen.

7. A process of claim 6 wherein the oxygen-containing gas is ambient air comprising about 21% by volume of oxygen.

8. A process of claim 7 wherein the support is silica comprising reactive OH groups.

9. A process of claim 8 wherein silica comprises about 0.1 to 2 mmoles of reactive OH groups per gram of silica after the heating step (i) is completed.

10. A process of claim 9 wherein the number of moles of said transition metal compound present in said solution of step (iv) is in excess of the stoichiometric amount thereof.

11. A process of claim 10 wherein the silica is heated at a temperature of about 800° C.

12. A process of claim 11 wherein the heating is continued until the silica comprises about 0.3 to about 0.7 mmoles of the OH groups per gram of carrier.

13. A process of claim 12 wherein the carrier is silica having a surface hydroxyl group concentration of about 0.5 mmoles/gr, a surface area of 300 M$^2$/gram and a pore volume of 1.65 m$^3$/gram.

14. A process of claim 13 wherein R is a C$_1$-C$_4$ alkane group and R' is a halogen.

15. A process of claim 14 wherein R' is bromine or chlorine.

16. A process of claim 15 wherein the organomagnesium composition is ethylmagnesium chloride.

17. A process of claim 16 wherein the first liquid is tetrahydrofuran.

18. A process of claim 17 wherein the first liquid is removed in step (iii) by evaporation.

19. A process of claim 18 wherein the molar ratio of the organomagnesium composition to the number of moles of the OH groups on the carrier is about 1.1 to about 3.5.

20. A process of claim 19 wherein the transition metal compound is a tetravalent titanium compound.

21. A process of claim 20 wherein the molar ratio of the tetravalent titanium compound to the organomagnesium composition is from about 3 to about 6.

22. A process of claim 21 wherein the tetravalent titanium compound is titanium tetrachloride.

23. A process of claim 22 wherein the catalyst promoter is at least one Group IIIB metal alkly, dialkylhalide or trialkylhalide having 1 to 20 carbon atoms per alkyl radical.

24. A process of claim 23 wherein the catalyst promoter is a trialkylaluminum compound having 1 to 6 carbon atoms per alkyl radical.

25. A process of claim 24 wherein the catalyst promoter is triethylaluminum.

26. A process of claim 25 wherein the productivity of the process is increased as compared to the same process conducted in the presence of the catalyst prepared with the solid, porous carrier heated in the atmosphere of a substantially pure nitrogen gas.

27. A process of claim 26 wherein the productivity is increased by at least about 25%.

28. A process of claim 27 wherein the polymer product has a higher bulk density as compared to polymer products prepared in the presence of similar catalysts prepared with the solid, porous carrier heated in the atmosphere of a substantially pure nitrogen gas.

* * * * *

UNITED STATES PATENT AND TRADEMARK OFFICE
CERTIFICATE OF CORRECTION

PATENT NO. : 4,634,752

DATED : January 6, 1987

INVENTOR(S) : R. O. Hagerty et al

It is certified that error appears in the above-identified patent and that said Letters Patent is hereby corrected as shown below:

Column 3, line 30, delete "amoient" and insert --ambient--
Column 4, line 53, delete "preferaoly" and insert --preferably--
Column 6, line 21, delete "oy" and insert --by--
Column 7, line 21, delete "tne" and insert --the--
Column 7, line 22, delete "soluole" and insert --soluble--
Column 7, line 36, delete "n-neptane" and insert --n-heptane--
Column 7, line 58, delete "non-soluole" and insert --non-soluble--
Column 9, line 31, delete "tnan" and insert --than--
Column 10, line 44, delete "desiraole" and insert --desirable--
Column 11, line 15, delete "emoodi-" and insert --embodi- --
Column 13, line 14, delete "tne" and insert --the--
Column 13, line 50, after "precursor" insert --at the rate of feed necessary to provide a sufficient concentration of the promoter in the reaction medium to obtain--
Column 16, line 27, delete "distrioution" and insert --distribution--
Column 16, line 36, after "contained" delete "tnerein" and insert --therein--
Column 16, line 42, after "of" delete "tne" and insert --the--
Column 17, line 6, after "with" delete "tne" and insert --the--
Column 18, line 41, after "down." delete "Tne" and insert --The--

Signed and Sealed this

Eighth Day of September, 1987

Attest:

DONALD J. QUIGG

Attesting Officer

Commissioner of Patents and Trademarks